(12) United States Patent
Loretz et al.

(10) Patent No.: US 10,461,352 B2
(45) Date of Patent: Oct. 29, 2019

(54) CONCENTRATION MANAGEMENT IN FLOW BATTERY SYSTEMS USING AN ELECTROCHEMICAL BALANCING CELL

(71) Applicant: Lockheed Martin Energy, LLC, Bethesda, MD (US)

(72) Inventors: Jeremy Loretz, Boston, MA (US); Kean Duffey, Brighton, MA (US); Sophia Lee, Philadelphia, PA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 396 days.

(21) Appl. No.: 15/465,502

(22) Filed: Mar. 21, 2017

(65) Prior Publication Data

US 2018/0277868 A1  Sep. 27, 2018

(51) Int. Cl.
  *H01M 8/18* (2006.01)
(52) U.S. Cl.
  CPC ............ *H01M 8/188* (2013.01); *Y02B 90/14* (2013.01); *Y02E 60/528* (2013.01)
(58) Field of Classification Search
  None
  See application file for complete search history.

(56) References Cited

U.S. PATENT DOCUMENTS

| | | | |
|---|---|---|---|
| 4,159,366 A | 6/1979 | Thaller | |
| 4,539,086 A | 9/1985 | Fujita et al. | |
| 5,026,465 A | 6/1991 | Katz et al. | |
| 5,258,241 A | 11/1993 | Ledjeff et al. | |
| 5,766,787 A | 6/1998 | Watanabe et al. | |
| 6,156,451 A | 12/2000 | Banerjee et al. | |
| 6,497,973 B1 | 12/2002 | Amendola | |
| 6,509,119 B1 | 1/2003 | Kobayashi et al. | |
| 7,179,561 B2 | 2/2007 | Niu et al. | |
| 2005/0084739 A1 | 4/2005 | Swider-Lyons et al. | |

(Continued)

FOREIGN PATENT DOCUMENTS

| | | |
|---|---|---|
| JP | H 08-21415 B2 | 3/1996 |
| JP | 2000-502832 A | 3/2000 |

(Continued)

OTHER PUBLICATIONS

International Search Report and Written Opinion from PCT/US2017/028191, dated Jul. 19, 2017, 12 pages.

(Continued)

*Primary Examiner* — Sarah A. Slifka
(74) *Attorney, Agent, or Firm* — BakerHostetler (57) ABSTRACT

During operation of flow battery systems, the volume of one or more electrolyte solutions can change due to solvent loss processes. An electrochemical balancing cell can be used to combat volume variability. Methods for altering the volume of one or more electrolyte solutions can include: providing a first electrochemical balancing cell containing a membrane disposed between two half-cells, establishing fluid communication between a first aqueous electrolyte solution of a flow battery system and a first half-cell of the first electrochemical balancing cell, and applying a current to the first electrochemical balancing cell to change a concentration of one or more components in the first aqueous electrolyte solution. Applying the current causes water to migrate across the membrane, either to or from the first aqueous electrolyte solution, and a rate of water migration is a function of current.

20 Claims, 2 Drawing Sheets

(56) References Cited

U.S. PATENT DOCUMENTS

| | | |
|---|---|---|
| 2011/0117411 A1 | 5/2011 | Horne et al. |
| 2011/0244277 A1 | 10/2011 | Gordon, II et al. |
| 2013/0084482 A1 | 4/2013 | Chang et al. |
| 2013/0316199 A1 | 11/2013 | Keshavarz et al. |
| 2014/0004402 A1 | 1/2014 | Yan et al. |
| 2015/0017494 A1 | 1/2015 | Amstutz et al. |
| 2016/0233531 A1 | 8/2016 | Reece et al. |
| 2016/0248109 A1 | 8/2016 | Esswein et al. |
| 2016/0308234 A1 | 10/2016 | Reece et al. |
| 2016/0308235 A1 | 10/2016 | Reece |

FOREIGN PATENT DOCUMENTS

| | | |
|---|---|---|
| JP | 2007-073428 A | 3/2007 |
| JP | 2010-539919 A | 12/2010 |
| WO | WO-97/24774 A1 | 7/1997 |
| WO | WO-02/15317 A1 | 2/2002 |
| WO | WO-2010/138942 A2 | 12/2010 |
| WO | WO-2013/090680 A2 | 6/2013 |
| WO | WO-2014/120876 A1 | 8/2014 |
| WO | WO-2014/142963 A1 | 9/2014 |
| WO | WO-2015/048074 A1 | 4/2015 |
| WO | WO-2015/173359 A1 | 11/2015 |
| WO | WO-2016/168360 A1 | 10/2016 |

OTHER PUBLICATIONS

International Search Report and Written Opinion from PCT/US2017/030451, dated Jul. 5, 2017, 13 pages.

Hosseiny et al., "A polyelectrolyte membrane-based vanadium air redox flow battery," Electrochemistry Communications, 2010, pp. 751-754, vol. 13.

Soloveichik, "Flow Batteries: Current Status and Trends," 2015, Chem. Rev., 115 (20), pp. 11533-11558.

Stassi et al., "Performance comparison of long and short-side chain perfluorosulfonic acid membranes for high temperature polymer electrolyte membrane fuel cell operation," J Power Sources, 2011, pp. 8925-8930, vol. 196.

Tseng et al., "A kinetic study of the platinum/carbon anode catalyst for vanadium redox flow battery," J Electrochemical Society, 2013, pp. A690-A696, vol. 160.

Whitehead et al., "Investigation of a method to hinder charge imbalance in the vanadium redox flow battery," J Power Sources, 2012, pp. 271-276, vol. 230.

Extended European Search Report from European Application No. 14857001.3, dated Apr. 26, 2017.

CONCENTRATION MANAGEMENT IN FLOW BATTERY SYSTEMS USING AN ELECTROCHEMICAL BALANCING CELL

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to techniques for managing the concentrations of components within one or more electrolyte solutions used in flow battery systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof synonymously refer to a material that undergoes a change in oxidation state during operation of a flow battery or like electrochemical energy storage system (i.e., during charging or discharging).

Although flow batteries hold significant promise for large-scale energy storage applications, they have often been plagued by sub-optimal energy storage performance (e.g., round trip energy efficiency) and limited cycle life, among other factors. Despite significant investigational efforts, no commercially viable flow battery technologies have yet been developed. Certain issues leading to poor energy storage performance, limited cycle life, and other performance-degrading factors are discussed hereinafter.

One issue occurring commonly during operation of flow batteries is that the active material concentration in one or more of the electrolyte solutions can change over time. Although degradation of an active material could result in a concentration decrease, the more common manner in which the active material concentration can change is through gain or loss of solvent. In an aqueous electrolyte solution, for example, loss of water can lead to an increase in the concentration of the active material. Water loss from an aqueous electrolyte solution can occur through a variety of means during operation of a flow battery such as, for example, due to heating during electrochemical reactions and/or when venting to release a gas generated during parasitic reactions, which are described further herein. In some cases, an aqueous electrolyte solution can gain water, thereby decreasing the active material concentration.

In view of the foregoing, flow battery systems capable of managing the concentrations of various components in an electrolyte solution would be highly desirable in the art. The present disclosure satisfies the foregoing needs and provides related advantages as well.

SUMMARY

In some embodiments, methods for transporting water to or from an aqueous electrolyte solution in a flow battery are described herein. The methods include: providing a first electrochemical balancing cell containing a membrane disposed between two half-cells; establishing fluid communication between a first aqueous electrolyte solution of a flow battery system and a first half-cell of the first electrochemical balancing cell; and applying a current to the first electrochemical balancing cell to change a concentration of one or more components in the first aqueous electrolyte solution. Applying the current causes water to migrate across the membrane, either to or from the first aqueous electrolyte solution. A rate of water migration is a function of current.

In other various embodiments, methods for transporting water to or from an aqueous electrolyte solution in a flow battery can include: providing a first electrochemical balancing cell containing a membrane disposed between two half-cells; establishing fluid communication between a first aqueous electrolyte solution of a flow battery system and a first half-cell of the first electrochemical balancing cell; determining a quantity of the first aqueous electrolyte solution in the flow battery system; applying a current to the first electrochemical balancing cell; and either introducing a balancing aqueous fluid to a second half-cell of the first electrochemical balancing cell or emptying the second half-cell of the first electrochemical balancing cell in response to the quantity of the first aqueous electrolyte solution that is determined. Applying the current causes water to migrate across the membrane into the first aqueous electrolyte solution when the balancing aqueous fluid is present in the second half-cell of the first electrochemical balancing cell. Applying the current causes water to migrate across the membrane into the second half-cell when the balancing aqueous fluid is absent from the second half-cell of the first electrochemical balancing cell. A rate of water migration is a function of current.

In still other various embodiments, the present disclosure describes flow battery systems including: a first half-cell containing a first aqueous electrolyte solution; a second half-cell containing a second aqueous electrolyte solution; a first electrochemical balancing cell containing a membrane disposed between two half-cells; and a source of a balancing aqueous fluid in fluid communication with the electrochemical balancing cell. Either the first half-cell or the second half-cell of the flow battery system is in fluid communication with a first half-cell of the first electrochemical balancing cell. The flow battery system is configured to introduce the balancing aqueous fluid to a second half-cell of the first electrochemical balancing cell when a quantity of the first aqueous electrolyte solution falls below a lower threshold and to withdraw the balancing aqueous fluid from the second half-cell of the first electrochemical balancing cell when the quantity of the first aqueous electrolyte solution exceeds an upper threshold.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to flow batteries containing an electrochemical balancing cell in fluid communication with at least one electrolyte solution. The present disclosure is also directed, in part, to methods for managing the active material concentration in at least one electrolyte solution using one or more electrochemical balancing cells.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. One issue that can complicate the operation of flow batteries is the alteration of active material concentrations and other component concentrations over the operational lifetime of a flow battery. Active material concentrations deviating in either direction (i.e., high or low) from the optimal working concentration range can be detrimental. An overly high active material concentration, for example, can exceed the solubility limit and result in damaging precipitation within the flow battery components. Low active material concentrations, in contrast, can lead to poor energy density values. Other components of an electrolyte solution that are out of a desired concentration range can be similarly problematic.

Before discussing further specifics of the flow battery systems and methods of the present disclosure, illustrative flow battery configurations and their operating characteristics will first be described in greater detail hereinafter.

Figure 1:
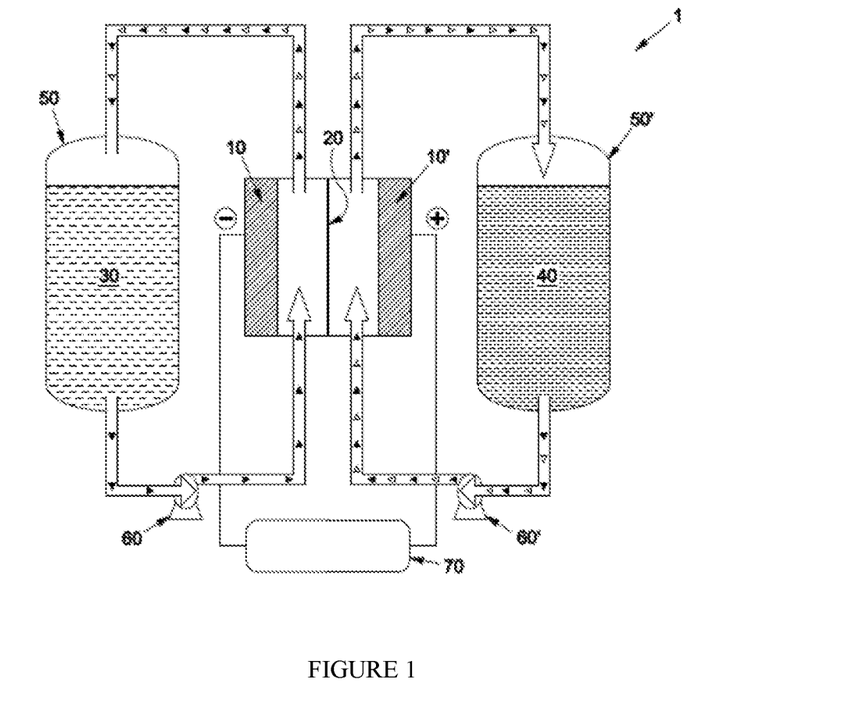
FIG. 1 depicts a schematic of an illustrative flow battery containing a single electrochemical cell.

FIG. 1 depicts a schematic of an illustrative flow battery containing a single electrochemical cell. Although FIGURE, 1 shows a flow battery containing a single electrochemical cell, approaches for combining multiple electrochemical cells together in an electrochemical cell stack are known and are discussed hereinbelow. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical cell stack. This design feature decouples the electrical energy storage system power from the energy storage capacity, thereby allowing for considerable design flexibility and cost optimization to be realized.

As shown in FIG. 1, flow battery 1 includes an electrochemical cell that features separator 20 (e.g., a membrane) that separates the two electrodes 10 and 10' of the electrochemical cell. As used herein, the terms "separator" and "membrane" synonymously refer to an ionically conductive and electrically insulating material disposed between the positive and negative electrodes of an electrochemical cell. Electrodes 10 and 10' are formed from a suitably conductive material, such as a metal, carbon, graphite, and the like. Although FIG. 1 has shown electrodes 10 and 10' as being spaced apart from separator 20, electrodes 10 and 10' can also be abutted with separator 20 in more particular embodiments. The material(s) forming electrodes 10 and 10' can be porous, such that they have a high surface area for contacting first electrolyte solution 30 and second electrolyte solution 40, the active materials of which are capable of cycling between an oxidized state and a reduced state during operation of flow battery 1. For example, one or both of electrodes 10 and 10' can be formed from a porous carbon cloth or a carbon foam in particular embodiments.

Pump 60 affects transport of first electrolyte solution 30 containing a first active material from tank 50 to the electrochemical cell. The flow battery also suitably includes second tank 50" that holds second electrolyte solution 40 containing a second active material. The second active material in second electrolyte solution 40 can be the same material as the first active material in first electrolyte solution 30, or it can be different. Second pump 60' can affect transport of second electrolyte solution 40 to the electrochemical cell. Pumps (not shown in FIG. 1) can also be used to affect transport of the first and second electrolyte solutions 30 and 40 from the electrochemical cell back to tanks 50 and 50'. Other methods of affecting fluid transport, such as siphons, for example, can also suitably transport first and second electrolyte solutions 30 and 40 into and out of the electrochemical cell. Also shown in FIG. 1 is power source or load 70, which completes the circuit of the electrochemical cell and allows a user to collect or store electricity during its operation. Connection to the electrical grid for charging or discharging purposes can also occur at this location.

It should be understood that FIG. 1 depicts a specific, non-limiting embodiment of a flow battery. Accordingly, flow batteries consistent with the spirit of the present disclosure can differ in various aspects relative to the configuration of FIG. 1. As one example, a flow battery can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical cell stack in order to increase the rate that energy can be stored and released during operation. The amount of energy released is determined by the overall amounts of active materials that are present. An electrochemical cell stack utilizes bipolar plates between adjacent electrochemical cells to establish electrical communication but not fluid communication between the two cells across the bipolar plate. Thus, bipolar plates contain the electrolyte solutions in an appropriate half-cell within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized that bipolar plates are not necessarily entirely non-porous entities, however. Bipolar plates can have innate or designed flow channels, for example, that provide a greater surface area for allowing an electrolyte solution to contact the bipolar plate. Suitable flow channel configurations can include, for example, interdigitated flow channels. In some embodiments, the flow channels can be used to promote delivery of an electrolyte solution to an electrode within the electrochemical cell.

An electrolyte solution can be delivered to and withdrawn from each electrochemical cell via an inlet manifold and an outlet manifold (not shown in FIG. 1). In some embodiments, the inlet manifold and the outlet manifold can provide and withdraw an electrolyte solution via the bipolar plates separating adjacent electrochemical cells. Separate inlet manifolds can provide each electrolyte solution individually to the two half-cells of each electrochemical cell. Likewise, separate outlet manifolds withdraw the electrolyte solutions from the positive and negative half-cells. In more particular embodiments, the inlet manifold and the outlet manifold can be configured to supply and withdraw the electrolyte solutions via opposing lateral faces of the bipolar plates (e.g. by supplying and withdrawing the electrolyte solution from opposing ends of the flow channels within the bipolar plate). Thus, the electrolyte solutions circulate laterally through the individual half-cells of the flow battery system.

As indicated above, the concentration of one or more active materials or other components in an electrolyte solution of a flow battery system can change in concentration during prolonged operation of the flow battery system and possibly reach out-of-range values. For example, solvent loss can occur when venting the flow battery system to remove gaseous reaction products, which can be formed during parasitic reactions. Solvent migration between the two electrolyte solutions can also occur if the solvent potentials are different in the two half-cells. Out-of-range concentration values can result in inefficient operation of the flow battery system or precipitation from the electrolyte solution in some instances. Although out-of-range concentration values can be addressed through manually introducing solvent to the electrolyte solution or heating the electrolyte solution to evaporate a portion of the solvent, both approaches can be problematic, particularly when performed on an electrolyte solution contained within a closed circulation loop of a flow battery system. Evaporative approaches employing heating can consume substantial energy, which can lower the overall operating efficiency of the flow battery system when considered on the whole. In addition, measuring concentrations to determine the amount of concentration or dilution needing to take place can be difficult in its own right.

The present inventors discovered that an electrochemical balancing cell disposed in fluid communication with either the positive or negative electrolyte solution of a flow battery system can be used to maintain the electrolyte solution at a desired concentration level, in addition to maintaining state of charge balance. Specifically, the inventors discovered that a two-chamber balancing cell can be used to either add or remove solvent from an electrolyte solution in a flow battery system, thereby increasing or decreasing the concentration of one or more components therein. Advantageously, such use of an electrochemical balancing cell can take place in concert with the balancing cell's conventional function of maintaining state of charge balance, as discussed hereinafter. Water can be migrated to maintain concentrations in aque- ous electrolyte solutions, and other solvents can be migrated similarly in non-aqueous electrolyte solutions.

During operation of a flow battery system, maintaining the electrolyte solutions in charge balance with one another is usually desirable. A balanced state of charge usually occurs when the active material in a first electrolyte solution is oxidized and the active material in a second electrolyte solution is concurrently reduced in productive reactions, thereby maintaining the two electrolyte solutions in state of charge balance with one another. The term "state of charge" (SOC) is a well understood electrochemical energy storage term and refers to the relative amounts of reduced and oxidized species at an electrode within a given half-cell of an electrochemical system. As used herein, the term "productive reactions" refer to electrochemical reactions of flow battery active materials that contribute to the flow battery's proper operation during charging and discharging cycles. If only productive reactions occurred in a flow battery system, the electrolyte solutions would continually remain in a charge balanced state.

Undesirable parasitic reactions can also occur within one or both half-cells of flow battery systems that can upset the desired state of charge balance. As used herein, the term "parasitic reaction" refers to any side electrochemical reaction that takes place in conjunction with productive reactions. Parasitic reactions can involve any component of an electrolyte solution that is not the active material, particularly the solvent of the electrolyte solution. Electrochemical reactions of an active material that render the active material unable to undergo reversible oxidation and reduction can also be considered parasitic in nature. Parasitic reactions that commonly occur in aqueous electrolyte solutions are reduction of water into hydrogen at the negative electrode and/or oxidation of water into oxygen at the positive electrode. Furthermore, parasitic reactions in aqueous electrolyte solutions can change the electrolyte solution's pH, which can destabilize the active material in some instances. Hydrogen evolution in a negative electrolyte solution, for example, can raise the pH by consuming protons and forming hydroxide ions.

Discharge arising from parasitic reactions can decrease the operating efficiency and other performance parameters of flow battery system. In the case of a parasitic reaction that occurs preferentially in one half-cell over the other, an imbalance in state of charge can result between the negative and positive electrolyte solutions. Charge imbalance between the electrolyte solutions of a flow battery system can lead to mass transport limitations at one of the electrodes, thereby lowering the round-trip operating efficiency. Since the charge imbalance can grow with each completed charge and discharge cycle, increasingly diminished performance of a flow battery system can result over time due to parasitic reactions. Parasitic generation of hydrogen at a negative electrode can further result in undercharging or partial discharging of the negative electrolyte solution, which can produce a state of charge imbalance.

Types of parasitic reactions that can occur in flow battery systems containing aqueous electrolyte solutions include, for example, generation of hydrogen and oxidation by oxygen. Hydrogen generation in the negative electrolyte solution of flow batteries can be especially problematic due to pH changes and the state of charge imbalance accompanying this parasitic reaction. Parasitic evolution of hydrogen in the negative half-cell of a flow battery system can occur as shown in Reaction 1 below.

(Reaction 1)

During ideal charging conditions, all current passing through the flow battery system charges the active materials in the negative and positive electrolyte solutions. When Reaction 1 occurs, however, a fraction of the current promotes hydrogen evolution, not charging of the active material in the negative electrolyte solution. At the end of the charging cycle, the state of charge of the negative electrolyte solution is lower than that of the positive electrolyte solution, assuming no parasitic reactions occurred in the positive electrolyte solution. The extent of the state of charge imbalance can increase over successive charge and discharge cycles.

Conventional approaches for rectifying a state of charge imbalance between two electrolyte solutions can involve reducing the active material in the negative electrolyte solution within one half-cell of a two-chamber electrochemical balancing cell until the two electrolyte solutions are brought back into charge balance with one another. As used herein, the term "electrochemical balancing cell" refers to a sub-system of a flow battery system in which the state of charge of one electrolyte solution can be adjusted without simultaneously changing the state of charge of the other electrolyte solution. A typical electrochemical balancing cell contains a separator disposed between a first half-cell and a second half-cell, in which the electrolyte solution is contained or circulated through one half-cell and a rebalancing aqueous fluid is contained or circulated through the second half-cell. As such, a two-chamber electrochemical balancing cell bears some similarity to the individual electrochemical cells of a flow battery system, but does not charge or discharge both active materials simultaneously, given that only one active material is circulated through the electrochemical balancing cell. Further description of two-chamber electrochemical balancing cells that can be employed in the various embodiments of the present disclosure can be found in U.S. Patent Application Publication 2016/0233531, which is incorporated herein by reference in its entirety. Three-chamber electrochemical balancing cells can also be utilized in the present disclosure in some instances.

Oxidation of water is performed using conventional balancing cell approaches (i.e., two-chamber balancing cell approaches) in the half-cell opposite that in which the electrolyte solution from the flow battery system is contained or circulated. In one balancing approach, water is oxidized to oxygen and protons in a rebalancing aqueous fluid under the mediation of an oxygen-generation catalyst, and the active material in the negative electrolyte solution undergoes reduction in a corresponding half-reaction within the other half-cell of the two-chamber electrochemical balancing cell. Protons generated from the oxidation of water can migrate across the membrane to offset the increased negative charge resulting from reduction of the active material in the negative electrolyte solution. Operating voltages of up to approximately 3.5 V are used in this conventional approach to a promote state of charge balancing. In more specific embodiments, the operating voltage can range between about 2.4 V to about 3.5 V.

In addition to the migration of protons across the membrane, water can also cross the membrane under the influence of the applied potential. Non-aqueous solvents can migrate similarly under the applied potential. In addition to the applied potential, the rate of water or other solvent migration can be impacted by the activities (chemical potential) of the solvent upon either side of the membrane in the electrochemical balancing cell. The present inventors recognized that the migration of water or other solvent into the electrolyte solution in the electrochemical balancing cell could also be exploited to alter the concentrations of the active material and other components in the electrolyte solution, thereby offsetting concentration changes arising from loss of water or other solvent during operation of the flow battery system. The inventors discovered that the rate of water migration from the balancing aqueous fluid to the electrolyte solution is a function of the amount of current applied to the electrochemical balancing cell. As such, the amount of applied current can be adjusted to control the amount of water being introduced to the electrolyte solution, thereby increasing its volume and decreasing the concentrations of various components present in the electrolyte solution. Further advantageously, such introduction of water to the electrolyte solution can occur in concert with charge rebalancing, provided the applied voltage is sufficiently high to promote the catalytic production of oxygen at a high enough rate. If only a concentration adjustment of the electrolyte solution is needed, however, water migration at lower voltages can also be accomplished without altering the state of charge.

The present inventors also surprisingly discovered that water migration in the opposite direction within the electrochemical balancing cell can also be realized, thereby increasing the concentration of the active material or other components in the electrolyte solution. Water migration from the electrolyte solution of the flow battery system to the opposing half-cell in the electrochemical balancing cell can take place by operating the electrochemical balancing cell with one half-cell empty or otherwise devoid of the balancing aqueous fluid. Although it might seem counterintuitive to operate the electrochemical balancing cell with only one half-cell filled with fluid (i.e., the electrolyte solution), the inventors found that a current could still be applied thereto without harming the cell components. In particular, the membrane in the electrochemical balancing cell can be configured to withstand the hydrostatic pressures present when one half-cell is empty (e.g., through designed flow fields, membrane hydration, small areas of unsupported membrane contact with the electrolyte solution, and/or low operating pressures). Once a sufficient amount of water has been removed from the electrolyte solution, normal operation of the electrochemical balancing cell can then resume. The cycles of water introduction and removal can take place iteratively as needed during operation.

Further advantageously, operation of the electrochemical balancing cell can be automated in a feedback loop without actually having to determine the concentration of the active material or any other component within the electrolyte solution. Specifically, provided that a known quantity of the electrolyte solution is loaded in the flow battery system, the quantity of the electrolyte solution can be measured through various types of sensors and relayed to automated processing controls configured to operate the electrochemical balancing cell in a particular manner. For example, the weight or volume of the electrolyte solution can be monitored at one or more locations in the flow battery system and relayed to the automated processing controls to direct operation of the electrochemical balancing cell. At this point, a processor within the automated processing controls can direct operation of the electrochemical balancing cell in a desired manner to either add or remove water from the electrolyte solution, as discussed above. Of course, in alternative embodiments, the quantity of the electrolyte solution can also be measured or observed manually, and/or regulation of the electrochemical balancing cell can take place with operator intervention.

By practicing the disclosure herein, additional advantages can also be realized. In conditions wherein one half-cell of the electrochemical balancing cell remains empty, savings resulting from water supply and pump downtime can be realized. In addition, pump and/or water supply maintenance can also take place during this time. A reduction in other subsystems can also be realized by employing the disclosure herein. For example, water can be alternatively supplied or removed by an additional reverse osmosis cell, but this can significantly increase cost. Supplying one of the fluids in the electrochemical balancing cell at a higher pressure can also push solvent in a desired direction, but this can result in energy and cost inefficiencies.

Finally, a second electrochemical balancing cell can also be employed to independently alter the amount of water present in the other electrolyte solution of the flow battery system. Although only one electrochemical balancing cell is usually needed in conventional approaches to maintain the two electrolyte solutions in a balanced state of charge (i.e., one electrolyte solution can be altered to match the state of charge of the other), it can be advantageous to operate two electrochemical balancing cells in the present disclosure to maintain independent concentration control of both electrolyte solutions. Operation and control of the second electrochemical balancing cell can take place in a manner similar to that described above.

Accordingly, flow battery systems of the present disclosure can contain a first half-cell containing a first aqueous electrolyte solution, a second half-cell containing a second aqueous electrolyte solution, a first electrochemical balancing cell containing a membrane disposed between two half-cells, and a source of a balancing aqueous fluid in fluid communication with the electrochemical balancing cell. The first half-cell of the flow battery system is in fluid communication with a first half-cell of the electrochemical balancing cell. The flow battery system is configured to introduce the balancing aqueous fluid to a second half-cell of the electrochemical balancing cell when a quantity of the first aqueous electrolyte solution falls below a lower threshold and to withdraw the balancing aqueous fluid from the second half-cell of the electrochemical balancing cell when the volume of the first aqueous electrolyte solution exceeds an upper threshold. The upper and lower thresholds are arbitrary and can vary based on the intended application in which the flow battery is employed.

Figure 2:
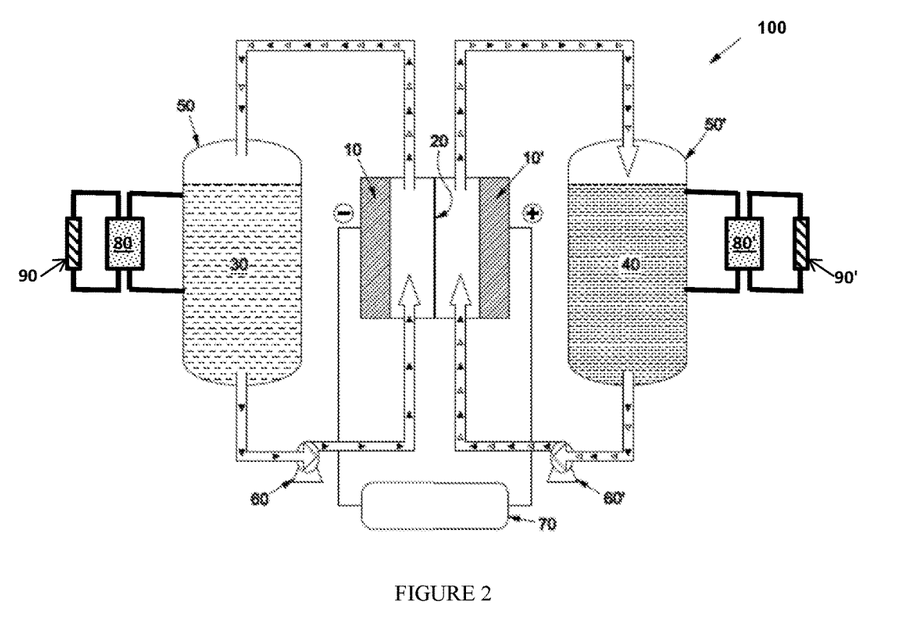
FIG. 2 shows the illustrative flow battery system of FIG. 1 further incorporating electrochemical balancing cells in fluid communication with each electrolyte solution.

The fluid communication between the electrochemical balancing cell and first half-cell of the flow battery system can be established at any location within the architecture of the flow battery system. For example, FIG. 2 shows the illustrative flow battery system of FIG. 1 further incorporating electrochemical balancing cells in fluid communication with each electrolyte solution via fluid connections off tanks 30 and 40. In some embodiments, an electrochemical balancing cell is in fluid communication with each electrolyte solution, and in other embodiments, an electrochemical balancing cell is in fluid communication with only one of the electrolyte solutions of the flow battery system. Further description of FIG. 2 follows below. Common reference characters will be used to denote elements previously described in FIG. 1.

Referring to FIG. 2, electrochemical balancing cell 80 is in fluid communication with tank 30, and electrochemical balancing cell 80' is in fluid communication with tank 40. Flow battery system 100 further includes reservoirs 90 and 90' in fluid communication with electrochemical balancing cells 80 and 80', respectively. Reservoirs 90 and 90' contain a balancing aqueous fluid, such as water or an electrolyte solution. Non-aqueous balancing fluids can alternately be used to adjust concentrations in non-aqueous electrolyte solutions. Flow battery system 100 is configured to circulate electrolyte solution from tanks 30 and 40 through one half-cell of electrochemical balancing cells 80 and 80'. Flow battery system 100 is also configured to circulate the balancing aqueous fluid (when needed) through the other half-cell of electrochemical balancing cells 80 and 80' from reservoirs 90 and 90'. Again, it is to be emphasized that the manner in which electrochemical balancing cells 80 and 80' are placed in fluid communication with the electrolyte solutions containing the active materials of the flow battery system can vary with system design. As such, the configuration of FIG. 2 should be considered non-limiting.

As mentioned above, various processing controls can be present in order to monitor and regulate the amount of one or more of the aqueous electrolyte solutions that are present in the flow battery systems of the present disclosure. In more specific embodiments, the flow battery systems can include a processor that is responsive to the amount of the first and/or second aqueous electrolyte solution and is configured to initiate introduction or withdrawal of the first and/or second aqueous electrolyte solution to or from the second half-cell of the electrochemical balancing cell(s).

Suitable processing controls can incorporate various blocks, modules, elements, components, methods and algorithms, which can be implemented through using computer hardware, software and combinations thereof. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the spirit and scope of the embodiments expressly described.

Computer hardware used to implement the various illustrative blocks, modules, elements, components, methods and algorithms described herein can include a processor configured to execute one or more sequences of instructions, programming or code stored on a readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. In some embodiments, computer hardware can further include elements such as, for example, a memory [e.g., random access memory (RAM), flash memory, read only memory (ROM), programmable read only memory (PROM), erasable PROM], registers, hard disks, removable disks, CD-ROMs, DVDs, or any other like suitable storage device.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and software.

As used herein, a machine-readable medium refers to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

In some embodiments, the flow battery systems of the present disclosure can include a detector configured to determine the quantity of the first and/or second aqueous electrolyte solution that is present in the flow battery system. Determination of the quantity of the first and/or second aqueous electrolyte solution can take place by measurement of the mass of the first and/or second aqueous electrolyte solution or by measuring the volume of the first and/or second aqueous electrolyte solution. For example, volume determination can take place in the tank in which the first and/or second aqueous electrolyte solution is stored, such as through using a float or other suitable apparatus for determining a liquid level in the tank. Other suitable detectors can include, for example, sonic level sensors, liquid column or differential pressure sensors, vibrating fork sensors or switches, capacity liquid level sensors, and the like. Optical sensors capable of measuring a concentration of one or more components in the electrolyte solution can also be used. Density measurement by determining the head pressure on the electrolyte solution can also be employed. Mass determination can be performed, for example, by weighing the tanks in which the first and/or second electrolyte solution is housed. The processor or processing controls described above can obtain an input from the detector and then regulate the operation of the electrochemical balancing cell(s) based upon the output of the detector. More particularly, in some embodiments, the processor or processing controls can be responsive to the volume(s) of the first and/or second aqueous electrolyte solution to initiate introduction or withdrawal of the first and/or second aqueous electrolyte solution to or from the second half-cell of the electrochemical balancing cell(s).

In various embodiments, an oxygen-generation catalyst can be present in the second half-cell of the electrochemical balancing cell(s). As used herein, the term "oxygen-generation catalyst" refers to a catalyst that is capable of converting water or hydroxide ions into oxygen under an applied potential. Some oxygen-generation catalysts can function under neutral or acidic conditions and affect conversion of water into oxygen and protons. Iridium oxide catalysts and iridium-ruthenium oxide catalysts or other noble metal catalysts can be suitably used in this regard. Other oxygen-generation catalysts can function under alkaline conditions and affect conversion of hydroxide ions into oxygen and water. Suitable oxygen-generation catalysts for oxidizing hydroxide ions to oxygen under alkaline conditions include, for example, nickel or nickel-based catalysts. These types of oxygen-generation catalysts can be advantageous due to their lower costs compared to iridium-based oxygen-generation catalysts. Carbon-based catalysts can also be used in some instances.

In view of the foregoing, the present disclosure also describes methods for adding or removing solvent from an electrolyte solution in a flow battery system in which at least one electrochemical balancing cell is present. More specifically, the present disclosure provides methods for increasing or decreasing the volume of an aqueous electrolyte solution in a flow battery system by using an electrochemical balancing cell. In some embodiments, independent regulation of the volume of each electrolyte solution in a flow battery system can take place by employing a first electrochemical balancing cell in fluid communication with the first aqueous electrolyte solution and a second electrochemical balancing in fluid communication with the second aqueous electrolyte solution.

In some embodiments, methods of the present disclosure can include providing a first electrochemical balancing cell containing a membrane disposed between two half-cells, establishing fluid communication between a first aqueous electrolyte solution of a flow battery system and a first half-cell of the first electrochemical balancing cell, and applying a current to the first electrochemical balancing cell. Applying the current causes water to migrate across the membrane, either to or from the first aqueous electrolyte solution. Migration of water from the first aqueous electrolyte solution increases the concentration of the active material and other components in the first aqueous electrolyte solution through decreasing the volume. As discussed above, water removal from the first aqueous electrolyte solution can be achieved by operating the first electrochemical balancing cell with the second half-cell of the first electrochemical balancing cell empty. In contrast, migration of water to the first aqueous electrolyte solution decreases the concentration of the active material and other components in the first aqueous electrolyte solution through increasing the volume. Water addition to the first aqueous electrolyte solution can be accomplished by applying a current to the first electrochemical balancing cell with a balancing aqueous fluid present in the second half-cell of the first electrochemical balancing cell. The rate of ingress or egress of water through the membrane of the first electrochemical balancing cell into or out of the first aqueous electrolyte solution can be adjusted through altering the amount of current being applied to the first electrochemical balancing cell.

In some or other various embodiments, methods of the present disclosure can include providing a first electrochemical balancing cell containing a membrane disposed between two half-cells, establishing fluid communication between a first aqueous electrolyte solution of a flow battery system and a first half-cell of the first electrochemical balancing cell, determining a quantity of the first aqueous electrolyte solution in the flow battery system, applying a current to the first electrochemical balancing cell, and either introducing a balancing aqueous fluid to a second half-cell of the first electrochemical balancing cell or emptying the second half-cell of the balancing aqueous fluid in response to the quantity of the first aqueous electrolyte solution that is determined. Applying the current causes water to migrate across the membrane into the first aqueous electrolyte solution when the balancing aqueous fluid is present in the second half-cell of the first electrochemical balancing cell, and applying the current causes water to migrate across the membrane into the second half-cell when the balancing aqueous fluid is absent from the first electrochemical balancing cell, such as when the second half-cell of the first electrochemical balancing cell is empty. A rate of water migration is a function of current applied to the electrochemical balancing cell. Other factors such as the electrolyte pressure, the balancing aqueous fluid pressure, and/or the salt content of the electrolyte solution or the balancing aqueous fluid can also impact migration rates.

In some embodiments, the second half-cell of the first electrochemical balancing cell contains a balancing aqueous fluid, in which case applying the current to the first electrochemical balancing cell causes water to migrate from the second half-cell of the first electrochemical balancing cell into the first aqueous electrolyte solution in the first half-cell of the first electrochemical balancing cell. As such, operating the first electrochemical balancing cell in this manner decreases an active material concentration in the first aqueous electrolyte solution, as well as decreasing the concentration of other components in the first aqueous electrolyte solution.

In more specific embodiments, the second half-cell of the first electrochemical balancing cell can contain an oxygen-generation catalyst. As such, in some embodiments, protons generated in the second half-cell can also migrate to the first aqueous electrolyte solution when a balancing aqueous fluid is present in the first electrochemical balancing cell. When the second half-cell of the first electrochemical balancing cell contains an oxygen-generation catalyst, adjustment of pH of the first aqueous electrolyte solution can also occur in conjunction with increasing the volume of the first aqueous electrolyte solution circulating through the first half-cell of the first electrochemical balancing cell. The oxidation of water in the balancing aqueous fluid represents the matching half-reaction of the reduction of the active material in the first aqueous electrolyte solution, thereby allowing state of charge adjustment to take place. As such, adjustment of the state of charge and pH of the first aqueous electrolyte solution can take place in conjunction with increasing the volume of the first aqueous electrolyte solution (decreasing the active material concentration), in some embodiments herein. In other embodiments, however, water migration across the membrane can take place at lower current values at which reduction of the active material and oxidation of water does not occur. Further discussion in this regard follows hereinbelow.

In some embodiments, a balancing aqueous fluid that can be present in the first electrochemical balancing cell is an aqueous electrolyte solution. As used herein, the term "aqueous" refers to the condition of water being the predominant component of a mixture or solution. As used herein, the term "aqueous electrolyte solution" refers to a homogeneous liquid phase containing water as a predominant solvent in which one or more mobile ions and/or active materials are present. Aqueous electrolyte solutions of the present disclosure encompass both solutions in water and water solutions containing a water-miscible organic solvent as a minority component. Aqueous electrolyte solutions employed in the second half-cell of the electrochemical balancing cell lack the active materials present in the aqueous electrolyte solutions circulated through the flow battery system for generating electricity. In other embodiments of the present disclosure, the balancing aqueous fluid can comprise water or consist essentially of water in which mobile ions are not present. In still more specific embodiments, the balancing aqueous fluid can consist of water alone. Optionally, a water-miscible organic solvent can be present in combination with water in embodiments in which mobile ions are not present.

Illustrative water-miscible organic solvents that can be present in aqueous electrolyte solutions include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery or electrochemical balancing cell, for example.

In addition to a solvent, aqueous electrolyte solutions can also include one or more mobile ions (i.e., an extraneous electrolyte) in some embodiments. In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Upon introducing water into the first aqueous electrolyte solution, as discussed above, it can become desirable in some cases to subsequently remove a portion of the water from the first aqueous electrolyte solution, such as if excess water is introduced to the first aqueous electrolyte solution or if the operating conditions of the flow battery system otherwise dictate a need to decrease the volume of the first aqueous electrolyte solution. In some embodiments, a signal to decrease the volume of the first aqueous electrolyte solution can occur via a feedback loop through appropriate processing controls, and in other embodiments, the signal to decrease the volume can take place through manual operator intervention. In either case, the methods of the present disclosure can facilitate a rapid alteration between supplying the balancing aqueous fluid to the second half-cell of the first electrochemical balancing cell or removing the balancing aqueous fluid to promote introduction or removal of water to or from the first aqueous electrolyte solution, as appropriate. More specifically, in some embodiments, methods of the present disclosure can include removing the balancing aqueous fluid from the second half-cell of the first electrochemical balancing cell, and after removing the balancing aqueous fluid, applying the current to the first electrochemical balancing cell while the second half-cell is empty. In such embodiments, applying the current causes water to migrate from the first half-cell into the empty second half-cell, thereby increasing an active material concentration or a concentration of another component in the first aqueous electrolyte solution.

In other embodiments, the first electrochemical balancing cell can be operated such that water is removed from the first aqueous electrolyte solution and then subsequently re-introduced to the first aqueous electrolyte solution, if necessary. Re-introduction of water to the first aqueous electrolyte solution can take place, for example, if excess water has been removed therefrom and/or if operating conditions otherwise dictate a subsequent increase in volume of the first aqueous electrolyte solution. Accordingly, some methods of the present disclosure can include those in which the second half-cell of the first electrochemical balancing cell is left empty, and applying the current to the first electrochemical balancing cell causes water to migrate from the first half-cell into the second half-cell, thereby increasing an active material concentration or a concentration of another component in the first aqueous electrolyte solution. Subsequently, the methods can further include introducing a balancing aqueous fluid into the second half-cell of the first electrochemical balancing cell, and after introducing the balancing aqueous fluid, applying the current to the first electrochemical balancing cell. As described above, applying the current to the first electrochemical balancing cell when the balancing aqueous fluid is present causes water to migrate from the second half-cell of the first electrochemical balancing cell into the first half-cell of the first electrochemical balancing cell, thereby decreasing an active material concentration or a concentration of another component in the first aqueous electrolyte solution. Again, the second half-cell of the first electrochemical balancing cell can contain an oxygen-generation catalyst, regardless of whether the rebalancing aqueous fluid is present or not.

In more specific embodiments, the first aqueous electrolyte solution can be circulated through a negative half-cell of the flow battery system. The negative half-cell of the flow battery system can include a negative electrode, and the corresponding positive half-cell of the flow battery system can include a positive electrode. As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. Use of an electrochemical balancing cell to modify at least the first aqueous electrolyte solution in contact with the negative electrode, as provided above, can be particularly desirable, given the greater propensity for this electrolyte solution to undergo parasitic reactions, as discussed herein. Although a second electrochemical balancing cell is not necessarily needed in conventional flow battery systems in which only state of charge rebalancing needs to take place, it can be desirable to include one in some embodiments herein, so that the volumes of the first aqueous electrolyte solution and the second aqueous electrolyte solution can be independently regulated with respect to one another.

The membrane present in the first electrochemical balancing cell is not considered to be particularly limited. Suitable membranes can include both cation-exchange membranes and anion-exchange membranes. Negatively charged cation-exchange membranes can be particularly suitable membranes for use in contacting an aqueous electrolyte solution containing a negatively charged active material. Charge matching between the membrane and the first aqueous electrolyte solution can slow or preclude crossover of the active material into the second half-cell of the first electrochemical balancing cell, thereby preserving the active material in the first aqueous electrolyte solution. Similar charge matching can be employed in the membrane dividing the two half-cells of the flow battery system in which the first and second aqueous electrolyte solutions are separately circulating, as discussed herein.

Suitable cation-exchange membranes in the first electrochemical balancing cell or between the half-cells of the flow battery system are not considered to be particularly limited. Particularly suitable cation-exchange membranes can frequently bear sulfonic acid groups due to their high degree of disassociation into sulfonate anions. Accordingly, in some embodiments, the cation-exchange membrane can include a sulfonated polymer, such as a sulfonated, perfluorinated polymer. NAFION (DuPont) is representative example of such a cation-exchange membrane. In other embodiments, the cation-exchange membrane can be a sulfonated hydrocarbon, such as a sulfonated polyetheretherketone or a sulfonated polysulfone.

In other embodiments, anion-exchange membranes can be included in the first electrochemical balancing cell or between the two half-cells of the flow battery system. Suitable anion-exchange membranes can include those bearing, for example, quaternary ammonium functional groups or phosphonium groups.

In still other embodiments, bipolar membranes can be present in the first electrochemical balancing cell or between the two half-cells of the flow battery system. As used herein, the term "bipolar membrane" is a membrane structure including both a cation-exchange membrane and an anion-exchange membrane. Any combination of cation-exchange and anion-exchange membranes can be used.

In illustrative embodiments, the electrochemical balancing cell can be operated at a current density of up to about 100 mA/cm$^2$. When an oxygen-generation catalyst is present, oxygen can be generated within this range. At the upper end of this range, the rate of oxygen generation can be significant if an oxygen-generation catalyst is present.

In certain embodiments, at least one of the first aqueous electrolyte solution and the second aqueous electrolyte solution can contain an active material that is a coordination complex. In some embodiments, both the first aqueous electrolyte solution and the second aqueous electrolyte solution can contain coordination complexes, where the coordination complexes differ from one another. Additional disclosure on illustrative coordination complexes follows hereinafter.

In some embodiments, flow batteries of the present disclosure can include an active material that is a coordination complex in one or more of the aqueous electrolyte solutions. Due to their variable oxidation states, transition metals can be highly desirable for use within the active materials of a flow battery system. Lanthanide metals can be used similarly in alternative embodiments. Cycling between the accessible oxidation states can result in the conversion of chemical energy into electrical energy. Suitable metals can include, for example, Al, Ca, Co, Cr, Cu, Fe, Hf, Mg, Mn, Mo, Ni, Pd, Pt, Ru, Sn Ti, Zn, Zr, V, W and U. Especially desirable transition metals for inclusion in a flow battery system include, for example, Al, Cr, Ti and Fe, particularly in the form of a coordination complex. For purposes of the present disclosure, Al is to be considered a transition metal. In some embodiments, coordination complexes within a flow battery can include at least one catecholate or substituted catecholate ligand.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (edta), and diethylenetriamine pentaacetic acid (dtpa).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

In some embodiments, one or more of the active materials can be coordination complexes having a formula of wherein D is an alkali metal ion, an ammonium ion, a tetraalkylammonium ion, a phosphonium ion or any combination thereof, g is an integer or non-integer value ranging between 1 and 6, M is a transition metal or lanthanide metal, and $L_1$-$L_3$ are bidentate ligands, such as those defined hereinabove. The value of g can depend upon whether $L_1$-$L_3$ bear an ionic charge. In some embodiments, at least one of $L_1$-$L_3$ can be a catecholate ligand or substituted catecholate ligand, and in other embodiments, each of $L_1$-$L_3$ is a catecholate ligand or a substituted catecholate ligand. In some or other embodiments, M is Ti. In embodiments in which M is Ti and $L_1$-$L_3$ are uncharged catecholate ligands, g has a value of 2 to provide charge balance against titanium (IV).

Flow battery systems of the present disclosure can incorporate flow batteries that are capable of providing sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, including those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator/membrane disposed between the first and second aqueous electrolyte solutions. The chambers provide separate reservoirs within the flow battery, through which the first and/or second aqueous electrolyte solutions circulate so as to contact the respective electrodes. Each chamber and its associated electrode and electrolyte solution define a corresponding half-cell. The separator provides several functions which include, for example, (1) serving as a barrier to mixing of the first and second aqueous electrolyte solutions, (2) electrically insulating to reduce or prevent short circuits between the positive and negative electrodes, and (3) facilitating ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, the electrolyte solutions can be transported from separate storage tanks through the corresponding chambers, as shown in FIGS. 1 and 3. In a charging cycle, electrical power can be applied to the cell such that the active material contained in the second aqueous electrolyte solution undergoes a one or more electron oxidation and the active material in the first aqueous electrolyte solution undergoes a one or more electron reduction, or vice versa. Similarly, in a discharge cycle the second active material is reduced and the first active material is oxidized to generate electrical power, or vice versa.

The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF$=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and poly ethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinyl idene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The crossover rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ awl cm$^{-2}$ day$^{-1}$, or less than about $1\times10^{-45}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign and (h) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporated within the present disclosure can have one or more of the following operating characteristics: (a) where, during the operation of the flow battery, the first or second active materials constitute less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane, (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than are available from a single electrochemical cell. In such cases, several battery cells can be connected in series such that the voltage of each cell is additive. This forms a bipolar stack, also referred to as an electrochemical stack. A bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming ac electricity into dc electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" refers to the total current passed in an electrochemical cell divided by the geometric area of the electrodes of the cell and is commonly reported in units of $mA/cm^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A method comprising:
   providing a first electrochemical balancing cell comprising a membrane disposed between two half-cells;
   establishing fluid communication between a first aqueous electrolyte solution of a flow battery system and a first half-cell of the first electrochemical balancing cell; and
   applying a current to the first electrochemical balancing cell to change a concentration of one or more components in the first aqueous electrolyte solution;
   wherein applying the current causes water to migrate across the membrane, either to or from the first aqueous electrolyte solution, and a rate of water migration is a function of current.

2. The method of claim 1, wherein a second half-cell of the first electrochemical balancing cell contains a balancing aqueous fluid, and applying the current causes water to migrate from the second half-cell into the first aqueous electrolyte solution in the first half-cell, thereby decreasing an active material concentration in the first aqueous electrolyte solution.

3. The method of claim 2, wherein the second half-cell of the first electrochemical balancing cell contains an oxygen-generation catalyst, and applying the current also generates protons from the balancing aqueous fluid;
wherein the protons also migrate from the second half-cell into the first aqueous electrolyte solution in the first half-cell.

4. The method of claim 2, further comprising:
removing the balancing aqueous fluid from the second half-cell; and
after removing the balancing aqueous fluid, applying the current to the first electrochemical balancing cell while the second half-cell is empty;
wherein applying the current to the first electrochemical balancing cell while the second half-cell is empty causes water to migrate from the first half-cell into the second half-cell, thereby increasing an active material concentration in the first aqueous electrolyte solution.

5. The method of claim 1, wherein a second half-cell of the first electrochemical balancing cell is left empty, and applying the current to the first electrochemical balancing cell causes water to migrate from the first half-cell into the second half-cell, thereby increasing an active material concentration in the first aqueous electrolyte solution.

6. The method of claim 5, further comprising:
introducing a balancing aqueous fluid into the second half-cell; and
after introducing the balancing aqueous fluid into the second half-cell, applying the current to the first electrochemical balancing cell;
wherein applying the current to the first electrochemical balancing cell causes water to migrate from the second half-cell into the first half-cell, thereby decreasing an active material concentration in the first aqueous electrolyte solution.

7. The method of claim 6, wherein the second half-cell of the first electrochemical balancing cell contains an oxygen-generation catalyst, and applying the current also generates protons from the balancing aqueous fluid;
wherein the protons also migrate from the second half-cell into the first aqueous electrolyte solution in the first half-cell.

8. The method of claim 1, wherein a state of charge of the first aqueous electrolyte solution also changes while applying the current to the first electrochemical balancing cell.

9. The method of claim 1, wherein the first aqueous electrolyte solution is circulated through a negative half-cell of the flow battery system.

10. The method of claim 1, wherein a second aqueous electrolyte solution of the flow battery system is in fluid communication with a second electrochemical balancing cell.

11. A method comprising:
providing a first electrochemical balancing cell comprising a membrane disposed between two half-cells;
establishing fluid communication between a first aqueous electrolyte solution of a flow battery system and a first half-cell of the first electrochemical balancing cell;
determining a quantity of the first aqueous electrolyte solution in the flow battery system;
applying a current to the first electrochemical balancing cell; and
either introducing a balancing aqueous fluid to a second half-cell of the first electrochemical balancing cell or emptying the second half-cell of the first electrochemical balancing cell in response to the quantity of the first aqueous electrolyte solution that is determined;
wherein applying the current causes water to migrate across the membrane into the first aqueous electrolyte solution when the balancing aqueous fluid is present in the second half-cell of the first electrochemical balancing cell, and applying the current causes water to migrate across the membrane into the second half-cell when the balancing aqueous fluid is absent from the second half-cell of the first electrochemical balancing cell, and a rate of water migration is a function of current.

12. The method of claim 11, wherein the second half-cell of the first electrochemical balancing cell contains an oxygen-generation catalyst, and applying the current to the first electrochemical balancing cell also generates protons when the balancing aqueous fluid is present;
wherein the protons also migrate from the second half-cell into the first aqueous electrolyte solution in the first half-cell.

13. The method of claim 11, wherein the balancing aqueous fluid is water or an aqueous electrolyte solution.

14. The method of claim 11, wherein a state of charge of the first aqueous electrolyte solution also changes while applying the current to the first electrochemical balancing cell.

15. The method of claim 11, wherein the first aqueous electrolyte solution is circulated through a negative half-cell of the flow battery system.

16. The method of claim 11, wherein a second aqueous electrolyte solution of the flow battery system is in fluid communication with a second electrochemical balancing cell.

17. A flow battery system comprising:
a first half-cell containing a first aqueous electrolyte solution;
a second half-cell containing a second aqueous electrolyte solution;
a first electrochemical balancing cell comprising a membrane disposed between two half-cells;
wherein either the first half-cell or the second half-cell of the flow battery system is in fluid communication with a first half-cell of the first electrochemical balancing cell; and
a source of a balancing aqueous fluid in fluid communication with the first electrochemical balancing cell, the flow battery system being configured to introduce the balancing aqueous fluid to a second half-cell of the first electrochemical balancing cell when a quantity of the first aqueous electrolyte solution falls below a lower threshold and to withdraw the balancing aqueous fluid from the second half-cell of the first electrochemical balancing cell when the quantity of the first aqueous electrolyte solution exceeds an upper threshold.

18. The flow battery system of claim 17, further comprising:
a detector configured to determine the quantity of the first aqueous electrolyte solution.

19. The flow battery system of claim 17, further comprising:
a processor responsive to the quantity of the first aqueous electrolyte solution and configured to initiate introduction or withdrawal of the first aqueous electrolyte solution to or from the second half-cell of the first electrochemical balancing cell.

20. The flow battery system of claim 17, wherein the second half-cell of the first electrochemical balancing cell contains an oxygen-generation catalyst.

* * * * *

UNITED STATES PATENT AND TRADEMARK OFFICE
CERTIFICATE OF CORRECTION

PATENT NO. : 10,461,352 B2
APPLICATION NO. : 15/465502
DATED : October 29, 2019
INVENTOR(S) : Loretz et al.

It is certified that error appears in the above-identified patent and that said Letters Patent is hereby corrected as shown below:

On the Title Page

Item [56], References Cited, under heading OTHER PUBLICATIONS:

Replace "Hosseiny et al., "A polyelectrolyte membrane-based vanadium air redox flow battery," Electrochemistry Communications, 2010, pp. 751-754, vol. 13." with --Hosseiny et al., "A polyelectrolyte membrane-based vanadium/air redox flow battery," Electrochemistry Communications, 2011, pp. 751-754, vol. 13.--

Replace "Whitehead et al., "Investigation of a method to hinder charge imbalance in the vanadium redox flow battery," J Power Sources, 2012, pp. 271-276, vol. 230." with --Whitehead et al., "Investigation of a method to hinder charge imbalance in the vanadium redox flow battery," J Power Sources, 2013, pp. 271-276, vol. 230.--

Signed and Sealed this
Eighteenth Day of February, 2020

Andrei Iancu
*Director of the United States Patent and Trademark Office*